United States Patent [19]

Bogema

[11] Patent Number: 5,492,034
[45] Date of Patent: Feb. 20, 1996

[54] TWIN COUNTERSHAFT TRANSMISSION AND IMPROVED POWER TAKE-OFF ARRANGEMENT THEREFOR

[75] Inventor: Edward J. Bogema, Vicksburg, Mich.

[73] Assignee: Eaton Corporation, Cleveland, Ohio

[21] Appl. No.: 442,591

[22] Filed: May 17, 1995

Related U.S. Application Data

[63] Continuation of Ser. No. 74,171, Jun. 9, 1993, abandoned.

[51] Int. Cl.$^6$ .................................................. F16H 47/00
[52] U.S. Cl. ...................... 74/730.1; 74/15.86; 74/732.1; 74/331
[58] Field of Search ............................ 74/11, 15.2, 15.66, 74/15.86, 665 R, 718, 720, 730.1, 732.1, 331; 180/53.4, 53.1

[56] References Cited

U.S. PATENT DOCUMENTS

| | | | |
|---|---|---|---|
| 2,962,915 | 12/1960 | Wiggermann | 74/730.1 X |
| 3,335,616 | 8/1967 | Perkins | 74/331 |
| 4,674,358 | 6/1987 | Nishimura | 74/745 |
| 4,754,665 | 7/1988 | Vandervoot | 74/745 |
| 4,784,019 | 11/1988 | Morscheck | 74/720 |
| 4,974,472 | 12/1990 | Nishimura et al. | 74/718 |

*Primary Examiner*—Rodney H. Bonck
*Assistant Examiner*—Peter Kwon
*Attorney, Agent, or Firm*—L. J. Kasper; Howard D. Gordon

[57] ABSTRACT

A change gear device (11) is disclosed of the type including a pair of substantially identical countershafts (27,29). The device includes a hydraulic PTO comprising a pair of fluid displacement mechanisms (71,73), each of which comprises a gerotor pump, and each of which receives input torque from one of the countershafts, by means of a pair of PTO input shafts (61,63), respectively. The PTO input shafts are clutched to the respective countershafts. The pressurized fluid output of the two fluid displacement mechanisms (71,73) is combined at a port (133), or other suitable location. Preferably, the two displacement mechanisms (71, 73) are substantially identical, such that equal torques are transmitted through the transmission countershafts (27,29) while the hydraulic PTO of the invention is in operation.

18 Claims, 3 Drawing Sheets

TWIN COUNTERSHAFT TRANSMISSION AND IMPROVED POWER TAKE-OFF ARRANGEMENT THEREFOR

This application is a continuation, of application Ser. No. 08/074,171, filed Jun. 9, 1993 and now abandoned.

BACKGROUND OF THE INVENTION

The present invention relates to transmissions of the multiple, substantially identical countershaft type, wherein means are provided for ensuring an even distribution of torque on all of said countershafts. More particularly, the present invention relates to such a transmission of the type having power take-off capability.

Although the present invention may be utilized in various types of change gear transmissions, it is especially suited for use in twin countershaft transmissions designed primarily for heavy-duty truck applications, and will be described in connection therewith. Twin countershaft transmissions of the type to which the present invention relates are illustrated and described in detail in U.S. Pat. No. 3,105,395, assigned to the assignee of the present invention and incorporated herein by reference.

The use of at least two substantially identical countershafts has a number of advantages which have been recognized by those skilled in the art at least since the issuance of the above-incorporated patent. The primary objective of a twin countershaft transmission is to ensure that the multiple countershafts each carry an equal share of the total torque being transmitted from the input shaft of the transmission to the output. If the torques are not substantially evenly divided between the countershafts, the true purpose of providing multiple countershafts is not achieved.

In various vehicle applications for transmissions of the type to which this invention relates, it is desirable to be able to direct all or a portion of the output power from the vehicle engine, through the transmission, to an auxiliary device. As is well known to those skilled in the art, an arrangement for taking off power from a transmission for an auxiliary device is typically referred to as a "PTO" (Power Take-Off). An example of such a vehicle application requiring a PTO would be a truck in which the trailer is equipped with a "moving floor" to facilitate loading or unloading of the contents of the trailer. Other examples would include a cement mixer, in which the drum must be rotatably driven, or the pumper on a fire truck, wherein the PTO drives the water pump.

In a typical, prior art PTO arrangement for twin countershaft transmissions, one or both of the countershafts is provided with a PTO gear, and an adjacent portion of the housing defines a window. An auxiliary device may be mounted to the transmission housing, at the window, with the device including a gear engageable with the PTO gear on the countershaft. The output of the gear in the PTO device may then be used to provide a mechanical PTO, or the gear may be used to drive a pump for a fluid pressure actuated (hydraulic) PTO.

The primary disadvantage of the typical, prior art PTO arrangement described above, whether mechanical or hydraulic, is that, by taking the PTO power from a single countershaft, the principle that power (or torque) be shared equally by countershafts is violated. One result of such an arrangement can be an "imbalance" whereby the gears on the main shaft are not balanced in the desired manner, as they normally are when power is being shared equally by the countershafts. This is especially undesirable in situations where the PTO must be useable while the vehicle is being driven, such as in the case of the cement mixer wherein the drum must be rotated while the mixer is driven to the job site.

SUMMARY OF THE INVENTION

Accordingly, it is an object of the present invention to provide a multiple countershaft transmission including a power take-off (PTO) arrangement which permits the transmission to continue operating on the principle of equal sharing of torques by the countershafts.

It is a more specific object of the present invention to provide a twin countershaft transmission having a hydraulic PTO which accomplishes the above-stated object, without the need for substantial additional structure, size, and complexity.

The above and other objects of the invention are accomplished by the provision of an improved change gear device of the type comprising a housing, an input shaft, an output means, and first and second spaced countershafts having parallel axes, and being mounted for rotation within the housing. First and second groups of gears are mounted on the first and second countershaft, respectively, the groups of gears being substantially identical. The device includes means for transmitting substantially one-half of input torque from the input shaft to each of the countershafts. A clutch means is included for selectively establishing a simultaneous driving relationship from each countershaft through one of the gears of the first and second groups of gears, to the output means.

The device includes first and second fluid displacement mechanisms, defining first and second outlet chambers, and including first and second rotatable pumping elements, respectively. There are first and second means operable to transmit rotary motion from the first and second countershafts, respectively, to the first and second rotatable pumping elements, respectively. Included are means which define first and second fluid passage means communicating pressurized fluid from the first and second outlet chambers, respectively, to an outlet port defined by the housing means.

DESCRIPTION OF THE PREFERRED EMBODIMENT

Figure 1:
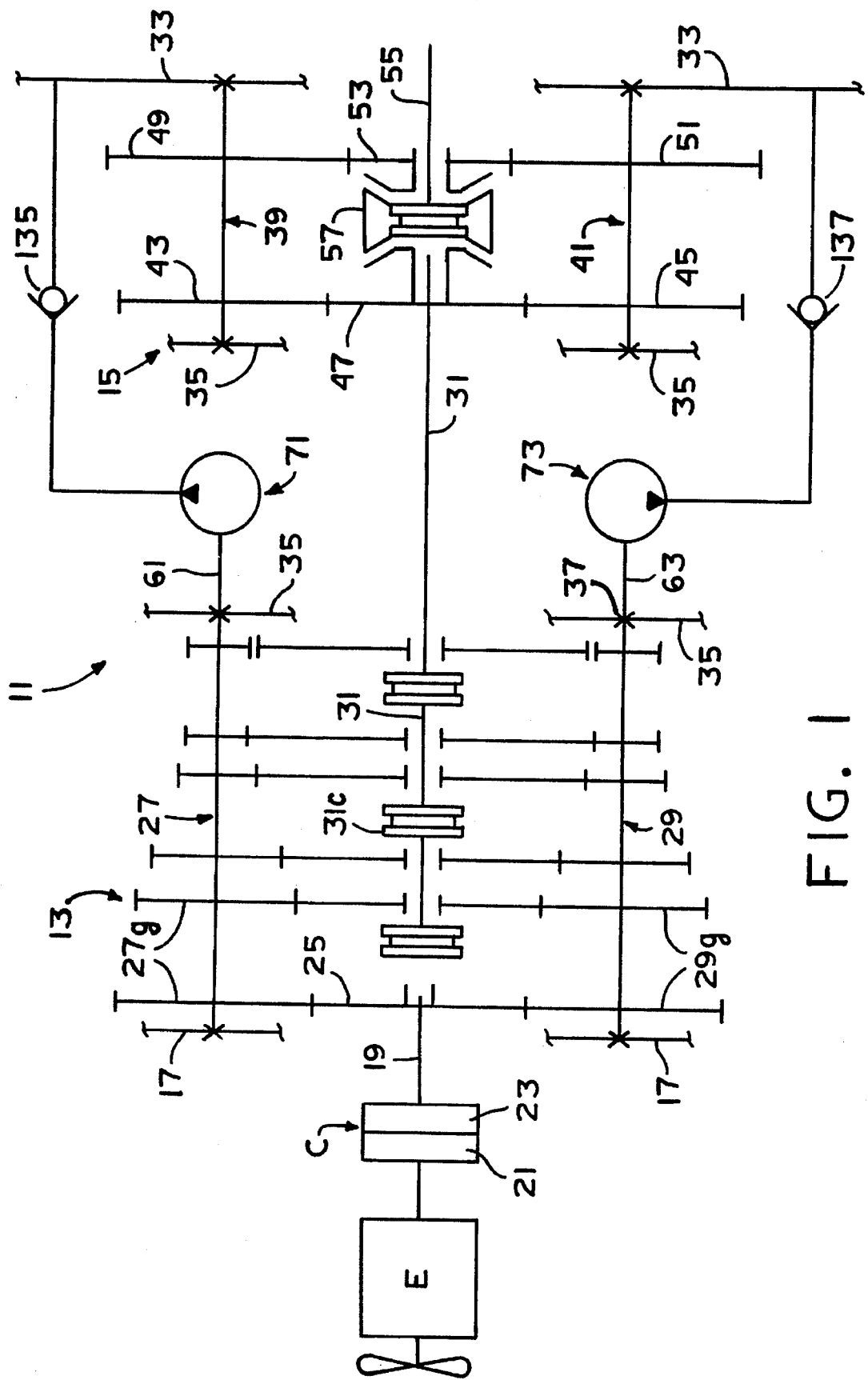
FIG. 1 is a schematic illustration of a twin countershaft transmission including the PTO arrangement of the present invention.

In the following description, certain terminology will be used for convenience of reference, but it will be understood that such terminology will be used for convenience only, and has no limiting significance. The words such as "upwardly", "downwardly", "rightwardly", and "leftwardly" will designate directions in the drawings to which reference is made. Words such as "forward" and "rearward" will refer respectively to the front and rear ends of the transmission as conventionally mounted in a vehicle, being from left and right sides, respectively, of the transmission as illustrated in the drawing figures. The words "inwardly" and "outwardly" will refer to directions toward and away from, respectively, the geometric center of the device, or an axis of rotation of the element to which reference is being made. Such terminology includes the words specifically mentioned above, as well as derivatives thereof and words of similar meaning.

Referring now to the drawings, which are not intended to limit the invention, FIG. 1 is a somewhat schematic view of a compound change gear transmission, which includes the PTO (Power Take-Off) arrangement of the present invention.

The term "compound transmission" is used to designate a change speed or change gear transmission having a main transmission section and an auxiliary transmission section, connected in series, whereby the selected gear reduction in the main transmission section may be compounded by further selected gear reduction in the auxiliary transmission section. Although the use of the present invention is not strictly limited to a compound transmission, the invention is especially advantageous when used with a compound transmission, and will be described in connection therewith. Several typical compound transmission configurations are illustrated and described both schematically and structurally in U.S. Pat. No. 4,788,889, assigned to the assignee of the present invention and incorporated herein by reference.

Referring now primarily to FIG. 1, which is not intended to limit the invention, there is illustrated schematically a range type compound change gear mechanical transmission, generally designated 11. The transmission 11 is a ten forward speed transmission comprising a front, main transmission section 13, and a rear, auxiliary transmission section 15. Although, in the subject embodiment, the main transmission section 13 comprises the "front" section, and the auxiliary transmission section 15 comprises the "rear" section 15, the invention is not so limited.

Typically, the transmission 11 is housed within a housing 17, and includes an input shaft 19, driven by a prime mover, such as a vehicle engine E through a selectively disengaged, normally engaged friction-type master clutch C. As is well known to those skilled in the art, the clutch C has an input or driving portion 21, drivingly connected to the engine crank shaft, and an output or driven portion 23, rotatably fixed to the transmission input shaft 19.

In the main transmission section 13, the input shaft 19 carries an input gear 25 for simultaneously driving a pair of substantially identical countershaft assemblies, generally designated 27 and 29. The reference numbers 27 and 29 may also be used hereinafter to refer specifically to the countershafts themselves. The countershafts 27 and 29 are provided on diametrically opposite sides of a main shaft 31, which is generally coaxially aligned with the input shaft 19.

Figure 2:
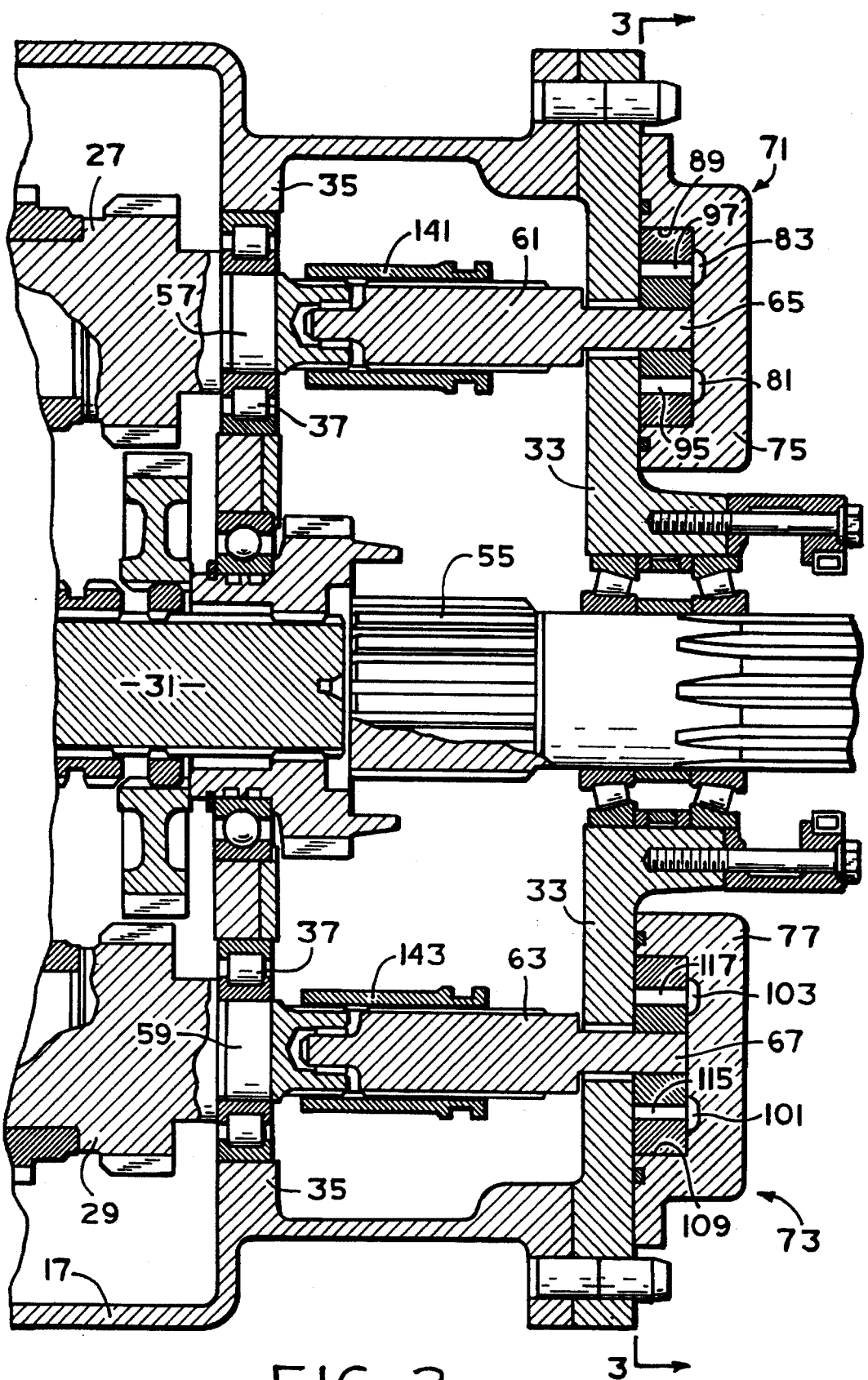
FIG. 2 is a fragmentary, generally horizontal axial cross-section of a portion of the twin countershaft transmission shown schematically in FIG. 1, including the PTO arrangement of the present invention.

The housing 17 typically includes a rear wall portion, schematically designated 33 in FIG. 1, but illustrated structurally in FIG. 2. Disposed intermediate, axially, the front wall of the housing 17 and the rear wall portion 33 is an intermediate wall portion 35, which is shown schematically in FIG. 1 as comprising two separate wall portions but which, as is well known to those skilled in the art, structurally comprises a single wall portion, as is shown in FIG. 2. The countershafts 27 and 29 are rotatably supported, relative to the housing 17 and intermediate wall portion 35 by suitable bearings, the bearings in the wall portion 35 being designated by the reference numeral 37. By way of reference, the bearings 37, supporting the countershafts 27 and 29, are shown in FIG. 2.

The various countershaft gears disposed on the countershafts 27 and 29, and the various main shaft gears disposed on the main shaft 31 will not be described in detail herein, in view of the incorporation of U.S. Pat. No. 4,788,889. Instead, the gears on the countershaft 27 (both individually and as a group), will be identified as 27g, while the gears on the countershaft 29 (both individually and as a group), will be identified as 29g. Similarly, the various sliding clutch collars, used for selective clutching of the gears on the main shaft 31, will be identified as 31c. Finally, the various control mechanisms, including shift forks and the shift bar housing assembly used to control the sliding clutch collars will also not be referenced or described herein.

Referring still to FIG. 1, the auxiliary transmission section 15 includes a pair of substantially identical, auxiliary countershaft assemblies 39 and 41, and the reference numerals 39 and 41 may be used hereinafter to refer to the countershafts themselves.

The countershafts 39 and 41, which are shown only in FIG. 1, are rotatably supported relative to the intermediate wall portion 35 and rear wall portion 33 by suitable bearing sets. The countershafts 39 and 41 carry auxiliary section countershaft gears 43 and 45, respectively, fixed for rotation therewith. The gears 43 and 45 are constantly meshed with, and support, auxiliary section range gear 47 which surrounds the main shaft 31. Auxiliary countershaft gears 49 and 51 are also fixed to and rotate with the countershafts 39 and 41, respectively, and are constantly meshed with, and support range/output gear 53. The output gear 53 surrounds an output shaft 55, shown also in FIG. 2, and is fixed for rotation therewith.

A synchronized sliding jaw clutch collar 57 is fixed for rotation with the output shaft 55 and is utilized selectively to couple either the range gear 47 or the output gear 53 to the output shaft 55. The output gear 53 is connected to the output shaft 55 only when the synchronizer 57 is shifted rearward. The structure and function of the auxiliary transmission section 15 is also now well known to those skilled in the art, and will not be described in any further detail, again partly in view of the above incorporation of U.S. Pat. No. 4,788,889.

As is also well known to those skilled in the art, and is especially relevant to the present invention, the input shaft 19 and the input gear 25 are always rotating, whenever the engine E is running and the driving and driven portions 21 and 23 of the normally-engaged master clutch C are frictionally engaged. Whenever the input gear 25 is rotating, both of the countershafts 27 and 29 are rotating. However, depending upon the condition of the shift control mechanism for shifting the clutch collars in the main transmission section 13, the mainshaft 31 may or may not be rotating. For example, with the shift mechanism in its neutral position, none of the mainshaft gears are clutched to the mainshaft 31, and therefore, the mainshaft 31 is not rotating. Whenever the mainshaft 31 is not rotating, the countershafts 39 and 41 in the auxiliary section 15 are not rotating, and similarly, none of the gears 43, 45, 47, 49, 51, and 53 is rotating, it the vehicle is stationary.

As is well known to those skilled in the art, the portion of FIG. 2 in horizontal cross-section is not necessarily "horizontal" as that term would normally be understood, i.e., being parallel to the ground. Although the mainshaft 31 and the two countershafts 27 and 29 do define a plane, that plane is not truly "horizontal", but instead, the countershaft 27

(upper countershaft) is above the axis of the mainshaft (see FIG. 3), while the countershaft 29 (lower countershaft) is below the axis of the mainshaft. It should be understood by those skilled in the art that such an arrangement is not an essential feature of the present invention, but instead, for the purposes of the present invention, the spatial relationship of the countershaft to the main shaft may be any relationship which provides satisfactory countershaft performance.

Figure 3:
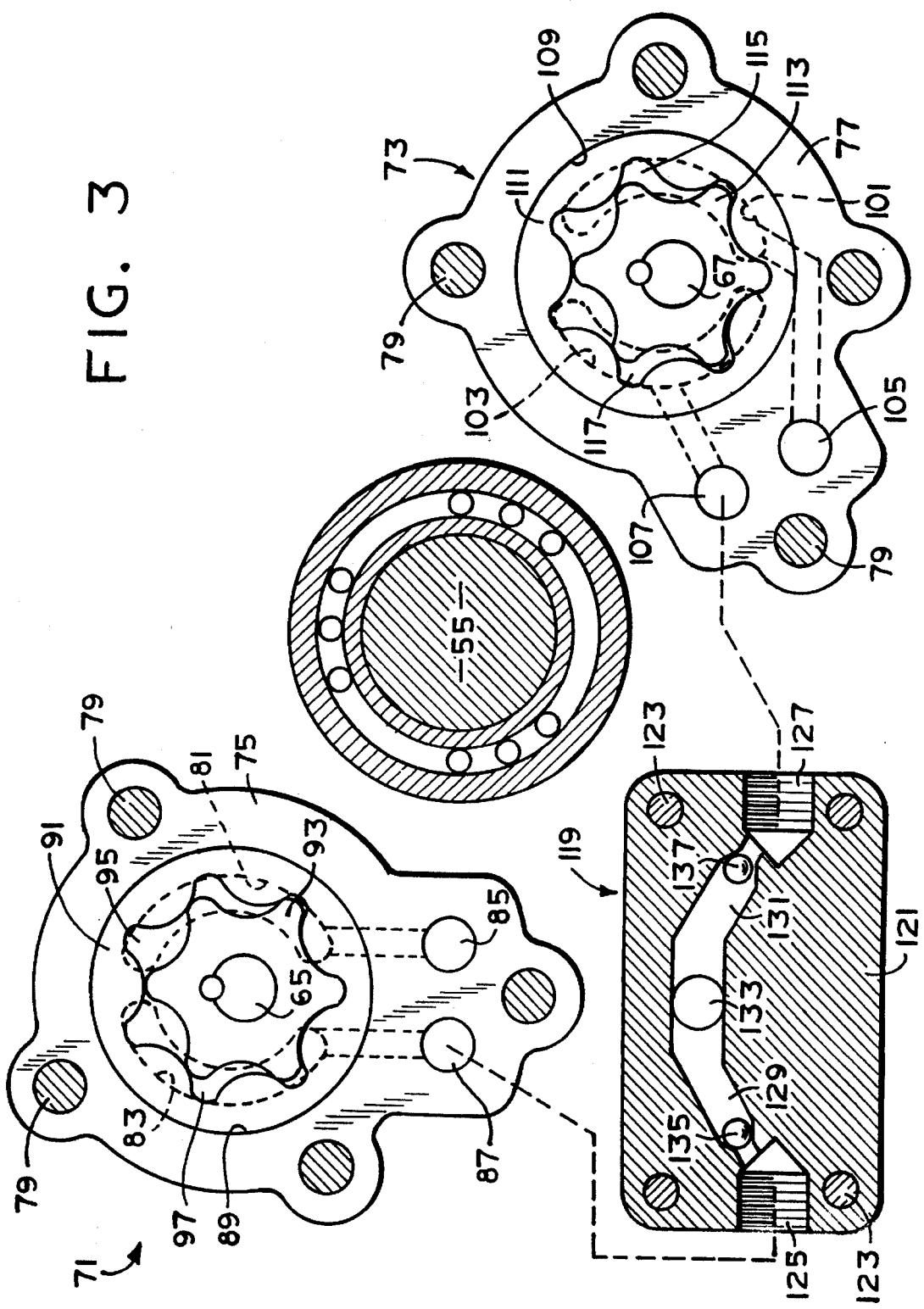
FIG. 3 is a somewhat schematic, transverse cross-section, taken generally on line 3—3 of FIG. 2, and on a somewhat larger scale, illustrating another aspect of the hydraulic PTO of the present invention.

Referring now primarily to FIGS. 2 and 3, in conjunction with FIG. 1, a primary embodiment of the present invention will be described. The countershafts 27 and 29 define, at their rearward ends, reduced diameter portions 57 and 59, respectively, the portions 57 and 59 being supported, relative to the intermediate wall 35, by the bearing sets 37. Disposed rearwardly of the reduced diameter portions 57 and 59 are PTO input shafts 61 and 63, respectively. The shafts 61 and 63 include reduced diameter portions 65 and 67, respectively, which extend through journalled openings in rear wall portion 33.

The reduced diameter portions 65 and 67 serve as the input shafts to a pair of PTO pumps, generally designated 71 and 73, respectively. The pumps 71 and 73 include pump housings 75 and 77, respectively, which are attached to the rearward side of the rear wall portion 33 by means of a plurality of bolts 79 (shown only in FIG. 3), or by any other suitable means.

Referring still primarily to FIGS. 2 and 3, the pump housing 75 defines an inlet kidney 81, and an outlet kidney 83, the kidneys 81 and 83 being connected to an inlet port 85 and an outlet port 87, respectively. The pump housing 75 defines an annular pumping chamber 89, and disposed rotatably therein is an internally-toothed outer rotor 91, and an externally-toothed inner rotor 93, which is pinned or keyed to the reduced diameter portion 65 of the PTO input shaft 61, and receives input torque therefrom. With the rotors 91 and 93 rotating in the counter-clockwise direction (see arrows, as shown), the toothed engagement of the rotors defines a plurality of expanding volume chambers 95, in fluid communication with the inlet kidney 81, and a plurality of contracting volume chambers 97, in fluid communication with the outlet kidney 83.

Similarly, the pump housing 77 defines an inlet kidney 101, and an outlet kidney 103, the kidneys 101 and 103 being connected to an inlet port 105 and an outlet port 107, respectively. The pump housing 77 defines an annular pumping chamber 109, and disposed rotatably therein is an internally-toothed outer rotor 111, and an externally-toothed inner rotor 113, which is pinned or keyed to the reduced diameter portion 67 of the PTO input shaft 63, and receives input torque therefrom. With the rotors 111 and 113 rotating in the counter-clockwise direction (see arrows, as shown), the toothed engagement of the rotors defines a plurality of expanding volume chambers 115, in fluid communication with the inlet kidney 101, and a plurality of contracting volume chambers 117, in fluid communication with the outlet kidney 103.

Also connected to a rearward surface of the rear wall portion 33 is a port block assembly, generally designated 119 which comprises a housing 121 connected by means of a plurality of bolts 123. For simplicity, the housing 121 is shown as defining an inlet port 125, plumbed to the outlet port 87 of the PTO pump 71, and as defining an inlet port 127 plumbed to the outlet port 107 of the PTO pump 73. The housing 121 further defines a pair of passage segments 129 and 131 which join to feed fluid to an outlet port 133. Disposed in the passage 129 is a ball-check valve 135, and disposed in the passage 131 is a ball-check valve 137.

Referring again primarily to FIG. 2, the reduced diameter portion 57 and the PTO input shaft 61 are both externally splined, and in splined engagement therewith is an internally-splined clutch collar 141. Similarly, the reduced diameter portion 59 and the PTO input shaft 63 are both externally splined, and in splined engagement therewith is an internally-splined clutch collar 143. The clutch collars 141 and 143 are shown in their engaged position in FIG. 2, whereby drive torque is transmitted from the countershafts 27 and 29 to the PTO pumps 71 and 73, respectively. Each of the clutch collars 141 and 143 can be shifted from the engaged position shown in FIG. 2, rearwardly (to the right in FIG. 2) to a disengaged position in which the internal splines of the clutch collars are in engagement with the external splines of only the PTO input shafts. When the clutch collars 141 and 143 are in the disengaged position, no torque is transmitted from the countershafts 27 and 29 to the PTO pumps, such that the PTO pumps do not consume any vehicle horsepower when the hydraulic PTO device is not being utilized.

In operation, with the engine E running, and the master clutch C engaged, the input shaft 19 and the countershafts 27 and 29 rotate continuously, and therefore, the reduced diameter portions 57 and 59 rotate continuously. Assuming clockwise rotation of the input shaft 19, both of the countershafts 27 and 29 will be rotating counter-clockwise, and each is normally transmitting the same amount of drive torque. With the clutch collars 141 and 143 shifted to the engaged position as shown in FIG. 2, torque is transmitted from the countershafts 27 and 29 through the PTO input shafts 61 and 63, respectively, to drive the inner rotors 93 and 113, respectively. With both of the rotors 91 and 93 rotating counter-clockwise, pressurized fluid is pumped from the contracting volume chambers 97 into the outlet kidney 83, and from there to the outlet port 87 and then to the inlet port 125 of the port block 119. Similarly, with the rotors 111 and 113 rotating counter-clockwise, pressurized fluid is pumped from the contracting volume chambers 117 into the outlet kidney 103, and from there to the outlet port 107, and then to the inlet port 127 of the port block 119. The pressurized fluid flows from the ports 125 and 127 past the ball-check valves 135 and 137, respectively, with the pressurized flows combining at the outlet port 133. The outlet port 133 could comprise a threaded port into which is threaded a fitting on a hydraulic hose (not shown) which would communicate pressurized fluid from the transmission 11 located on, for example, the tractor, and communicate the pressurized fluid to a hydraulic PTO device on, for example, the trailer.

Preferably, and as may be seen in FIGS. 2 and 3, the PTO pumps 71 and 73 are substantially "identical". As used herein, the term "identical" refers primarily to the amount of engine horsepower consumed by the pump. Therefore, if the rotor set for each of the pumps 71 and 73 is physically identical, i.e., the same size and displacement, the fact that the countershafts 27 and 29 are rotating at the same input speed will substantially guarantee that the two PTO pumps 71 and 73 will consume the same horsepower. However, at least theoretically, the PTO pumps 71 and 73 could be different, in some respects, and still accomplish the intended purpose of providing a hydraulic PTO which permits the transmission to maintain substantially identical loads on the countershafts.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A change gear device of the type comprising a housing, an input shaft, an output means, first and second spaced countershafts having generally parallel axes and mounted for rotation relative to said housing; first and second gears mounted on said first and second countershafts, respectively, said gears being substantially identical; means for transmitting substantially one-half of input torque from said input shaft to each of said countershafts, said means including said first and second gears mounted on said countershafts; clutch means for selectively establishing a simultaneous driving relationship from each of said first and second countershafts through one of said first and second gears to said output means; first and second fluid displacement means, defining first and second outlet chambers, respectively, said first and second fluid displacement means including first and second rotatable pumping elements, respectively, and first and second means operable to transmit rotary motion from said first and second countershafts, respectively, to said first and second pumping elements, respectively; and means defining first and second fluid passage means communicating pressurized fluid from said first and second outlet chambers, respectively, to an outlet port; said housing means including a rearward wall, and said output means comprises an output shaft extending through said wall; said first and second fluid displacement mechanisms comprising housing means defining first and second pumping chambers adapted to receive said first and second rotatable pumping elements, respectively; said means extending axially from said first and second countershafts to said first and second pumping elements comprising first and second input shafts, respectively; and first and second clutch means selectively operable to clutch said first and second input shaft to said first and second countershafts, respectively, said first and second input shafts and said first and second clutch means being disposed within said housing.

2. A change gear device as claimed in claim 1, characterized by said first and second fluid displacement mechanisms being substantially identical to each other.

3. A change gear device as claimed in claim 1, characterized by said first and second rotatable pumping elements being generally coaxial with said first and said second countershafts, respectively; and said first and said second means operable to transmit rotary motion comprising means extending axially from said first and second countershafts to said first and second pumping elements, respectively.

4. A change gear device as claimed in claim 1, characterized by said first and second fluid passage means include check valve means operable to permit flow of pressurized fluid from said outlet chamber to said outlet port, while preventing fluid flow in the reverse direction.

5. A change gear device as claimed in claim 1, characterized by said first rotatable pumping element comprising an internally-toothed outer rotor and an externally-toothed inner rotor, and said second rotatable pumping element comprises an internally-toothed outer rotor and an externally-toothed inner rotor.

6. A change gear device of the type comprising a housing, an input shaft, an output means, first and second spaced countershafts having generally parallel axes and mounted for rotation relative to said housing; first and second gears mounted on said first and second countershafts, respectively, said gears being substantially identical; means for transmitting substantially one-half of input torque from said input shaft to each of said countershafts; said means including said first and second gears mounted on said countershafts; clutch means for selectively establishing a simultaneous driving relationship from each of said first and second countershafts through one of said first and second gears to said output means; first and second fluid displacement means, defining first and second outlet chambers, respectively, said first and second fluid displacement means including first and second rotatable pumping elements, respectively, and first and second means operable to transmit rotary motion from said first and second countershafts, respectively, to said first and second pumping elements, respectively; and means defining first and second fluid passage means communicating pressurized fluid from said first and second outlet chambers, respectively, to an outlet port; said housing means including a rearward wall, and said first and second fluid displacement mechanisms comprising housing means defining first and second pumping chambers adapted to receive said first and second rotatable pumping elements, respectively, said housing means being attached to a rearward side of said rearward wall.

7. A change gear device as claimed in claim 6, characterized by said first and second fluid displacement mechanisms being substantially identical to each other.

8. A change gear device as claimed in claim 6, characterized by said first and second rotatable pumping elements being generally coaxial with said first and said second countershafts, respectively; and said first and said second means operable to transmit rotary motion comprising means extending axially from said first and second countershafts to said first and second pumping elements, respectively.

9. A change gear device as claimed in claim 6, characterized by said first and second fluid passage means include check valve means operable to permit flow of pressurized fluid from said outlet chamber to said outlet port, while preventing fluid flow in the reverse direction.

10. A change gear device as claimed in claim 6, characterized by said means extending axially from said first and second countershafts to said first and second pumping elements comprising first and second input shafts, respectively; and first and second clutch means selectively operable to clutch said first and second input shafts to said first and second countershafts, respectively, said first and second input shafts and said first and second clutch means being disposed within said housing.

11. A change gear device as claimed in claim 6, characterized by said first rotatable pumping element comprising an internally-toothed outer rotor and an externally-toothed inner rotor, and said second rotatable pumping element comprises an internally-toothed outer rotor and an externally-toothed inner rotor.

12. A system operable to transmit power from a vehicle engine, through a change gear device, to an auxiliary device external to, and independent of the change gear device, wherein the change gear device is of the type comprising a housing, an input shaft adapted to receive input power from the vehicle engine, an output means, first and second spaced countershafts having generally parallel axes and mounted for rotation relative to said housing; first and second gears mounted on said first and second countershafts, respectively, said gears being substantially identical; means for transmitting substantially one-half of input torque from said input shaft to each of said countershafts, said means including said first and second gears mounted on said countershafts; clutch means for selectively establishing a simultaneous driving relationship from each of said first and second countershafts through one of said first and second gears to said output means; first and second fluid displacement means, defining first and second outlet chambers, respectively, said first and second fluid displacement means including first and second rotatable pumping elements, respectively, and first and second means operable to transmit rotary motion from said first and second countershafts, respectively, to said first and second pumping elements, respectively; and means defining first and second fluid passage means communicating pressurized fluid from said first and second outlet chambers, respectively, to an outlet port in fluid communication with the auxiliary device.

13. A change gear device as claimed in claim 12, characterized by said first and second fluid displacement mechanisms being substantially identical to each other.

14. A change gear device as claimed in claim 12, characterized by said housing means including a rearward wall; said output means comprises an output shaft extending through said wall; said first and said second fluid displacement mechanisms comprising housing means defining first and second pumping chambers adapted to receive said first and second rotatable pumping elements, respectively.

15. A change gear device as claimed in claim 14, characterized by said first and second rotatable pumping elements being generally coaxial with said first and said second countershafts, respectively; and said first and said second means operable to transmit rotary motion comprising means extending axially from said first and second countershafts to said first and second pumping elements, respectively.

16. A change gear device as claimed in claim 14, characterized by said first and second fluid passage means include check valve means operable to permit flow of pressurized fluid from said outlet chamber to said outlet port, while preventing fluid flow in the reverse direction.

17. A change gear device as claimed in claim 14, characterized by said means extending axially from said first and second countershafts to said first and second pumping elements comprising first and second input shafts, respectively; and first and second clutch means selectively operable to clutch said first and second input shafts to said first and second countershafts, respectively, said first and second input shafts and said first and second clutch means being disposed within said housing.

18. A change gear device as claimed in claim 12, characterized by said first rotatable pumping element comprising an internally-toothed outer rotor and an externally-toothed inner rotor, and said second rotatable pumping element comprises an internally-toothed outer rotor and an externally-toothed inner rotor.

\* \* \* \* \*